United States Patent
Sciarone

(10) Patent No.: US 6,452,956 B1
(45) Date of Patent: Sep. 17, 2002

(54) SODERBERG-TYPE COMPOSITE ELECTRODE FOR ARC SMELTING FURNACE

(75) Inventor: Marcel Sciarone, 67 First Street, Linden Extension Randburg (ZA)

(73) Assignee: Marcel Sciarone, Randburg (ZA)

( * ) Notice: Subject to any disclaimer, the term of this patent is extended or adjusted under 35 U.S.C. 154(b) by 0 days.

(21) Appl. No.: 09/763,512

(22) PCT Filed: Aug. 23, 1999

(86) PCT No.: PCT/IB99/01458

§ 371 (c)(1),
(2), (4) Date: Apr. 27, 2001

(87) PCT Pub. No.: WO00/11226

PCT Pub. Date: Mar. 2, 2000

(30) Foreign Application Priority Data

Aug. 25, 1998 (ZA) ................................. 98/7131

(51) Int. Cl.[7] ............................. H05B 7/09; H05B 7/107
(52) U.S. Cl. ........................................... 373/89; 373/97
(58) Field of Search ............................. 373/88–92, 94, 373/97, 99, 101

(56) References Cited

FOREIGN PATENT DOCUMENTS

| EP | 0 372 236 | * 11/1989 |
|---|---|---|
| WO | WO 98/51129 | * 11/1998 |

* cited by examiner

Primary Examiner—Tu Ba Hoang
(74) Attorney, Agent, or Firm—Conley, Rose & Tayon, P.C.

(57) ABSTRACT

An electrode for a smelting furnace comprises an elongate casing including a plurality of spaced, inwardly projecting ribs extending radially from an inner surface of the casing towards the center of the casing. A central core of a pre-baked electrode, typically a solid or hollow pre-baked graphite electrode, is disposed within the casing free of the projecting ribs and defines a space between the core and the inner surface of the casing. A heating zone is located intermediate the ends of the casing so that a carbonaceous electrode paste received or receivable within the space between the core and the inner surface of the casing is calcined into a baked, hard form upon entering the heating zone. The projecting ribs assist in baking the electrode paste and in anchoring or supporting the electrode to reduce the risk of nipple or joint fracture of adjacent pre-baked electrodes. The electrodes are particularly useful in the smelting of ferrochromium and in the reduction of ores such as ilmenite. They also have application in the smelting of scrap metal in steel furnaces.

8 Claims, 1 Drawing Sheet

SODERBERG-TYPE COMPOSITE ELECTRODE FOR ARC SMELTING FURNACE

BACKGROUND OF THE INVENTION

This invention relates to smelting.

Smelting is an important process used for the production of many metals and alloys. Smelting takes place in a furnace with the heat necessary to melt the contents of the furnace being produced electrically. A DC arc plasma furnace is an example of a smelting furnace in which pre-baked graphite electrodes are conventionally used to direct electrical energy into the furnace bath. The consumption of the electrodes is an important cost item in the use of such a furnace.

Söderberg electrodes are used in various smelting processes. The Söderberg electrode comprises a casing which may have a plurality of inwardly projecting ribs. Electrode paste, which typically comprises a mixture of a carbonaceous material and a hydrocarbon binder, is introduced into one end of the casing. The paste passes down the casing until a zone is reached where it is subjected to a suitable calcining temperature to expel volatile substances and bake the paste into a hard form. The hard form emerges from an end of the casing and forms the working end of the electrode.

SUMMARY OF THE INVENTION

The present invention provides the use of a pre-baked graphite or similar electrode in combination with a Söderberg electrode.

Thus, according to a first aspect of the invention, an electrode for a smelting furnace comprises:

- an elongate casing including a plurality of spaced, inwardly projecting ribs extending radially from an inner surface of the casing towards the centre of the casing;
- a central core of a pre-baked electrode disposed within the casing free of the projecting ribs and defining a space between the core and the inner surface of the casing;
- a heating zone located intermediate the ends of the casing; and
- a carbonaceous electrode paste received or receivable within the space between the core and the inner surface of the casing, the paste being arranged to be calcined into a baked, hard form upon entering the heating zone.

The central core may either be a solid pre-baked graphite electrode or a hollow pre-baked graphite electrode defining a feed passage between open ends thereof for feeding charge material into the furnace.

The ribs are typically in the form of planar fins formed from an electrically conductive material, in particular mild steel or stainless steel. They preferably include a plurality of transversely formed apertures or holes for allowing electrode paste to pass through them so as to anchor or support the electrode upon baking.

The combined electrode of the invention will generally be cylindrical in shape and may be made of larger diameter than conventional pre-baked graphite electrodes. This enables the use of larger electrode currents and increased operating capacity. Further, the consumption of expensive graphite electrodes is reduced.

The invention has particular application to AC or DC arc plasma furnaces or Söderberg submerged arc furnaces and in the smelting applications where pre-baked graphite electrodes have traditionally been used.

DESCRIPTION OF EMBODIMENTS

Figure 1:
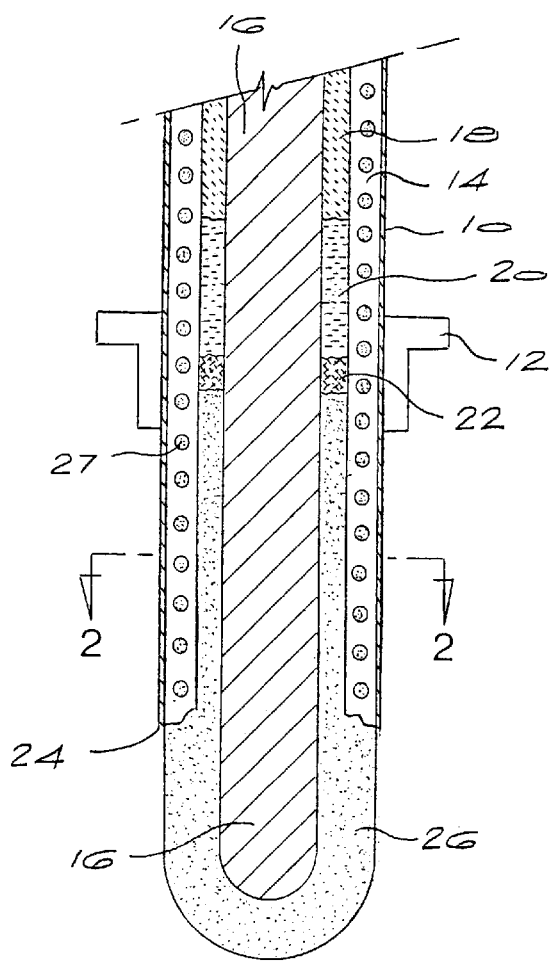
FIG. 1 is a schematic sectional side view of a first embodiment of the invention.

A first embodiment of the invention will now be described with reference to FIGS. 1 and 2. Referring to these figures, an electrode for use in a smelting furnace comprises an elongate cylindrical casing 10 mounted in an electrode holder 12. The mounting of the casing 10 in the holder 12 is such that it is possible to push the casing 10 through the holder 12 as the electrode is consumed, in use. The casing 10 has a plurality of spaced inwardly projecting ribs 14. The casing 10 and ribs 14 are typically formed from mild steel although any other suitable material such as stainless steel, for example, can be used.

Centrally located in the casing 10 is a solid pre-baked graphite electrode 16. A space is provided between the electrode 16 and the casing 10. Electrode paste 18 is introduced into the space. This electrode paste is typically a mixture of a carbonaceous material such as calcined anthracite and a hydrocarbon binder such as pitch or tar. The paste slides down to zone 20 where it softens, and then to zone 22 where it is subjected to temperatures of the order of 400° C. to 600° C. The level of this baking zone 22 may be controlled by using a heating or cooling device located just above holder 12, and monitored by continuous temperature measuring using a thermocouple, for example, in accordance with conventional methods. Volatile substances in the paste are expelled and it is calcined into a hard form. What emerges from the working end 24 of the casing 10 is a pre-baked graphite core 16 surrounded by calcined hard paste 26.

It is envisaged that apertures or holes 27 may be transversely formed through the projecting ribs 14 to allow electrode paste 18 to pass through them. Upon the paste hardening, the ribs 14 will anchor the calcined paste in place so as to provide support therefor. This releases the strain on the nipples between adjacent pre-baked electrodes. This reduces the risk of joint fracture and thus the risk of portions of the pre-baked electrode becoming dislodged and falling into the furnace. Being electrically conductive, the ribs or fins 14 also assist in baking the electrode paste 18.

In use, as the electrode is consumed, the casing 10 is pushed through the hole 12 and deeper into the furnace. The casing 10 and core 16 are replenished and further electrode paste 18 introduced into the space between the core 16 and casing 10. If desirable, anchoring means (not shown) may be provided for anchoring the graphite electrode 16 to the casing 10 prior to introducing the paste 18 into the space between them.

Figure 3:
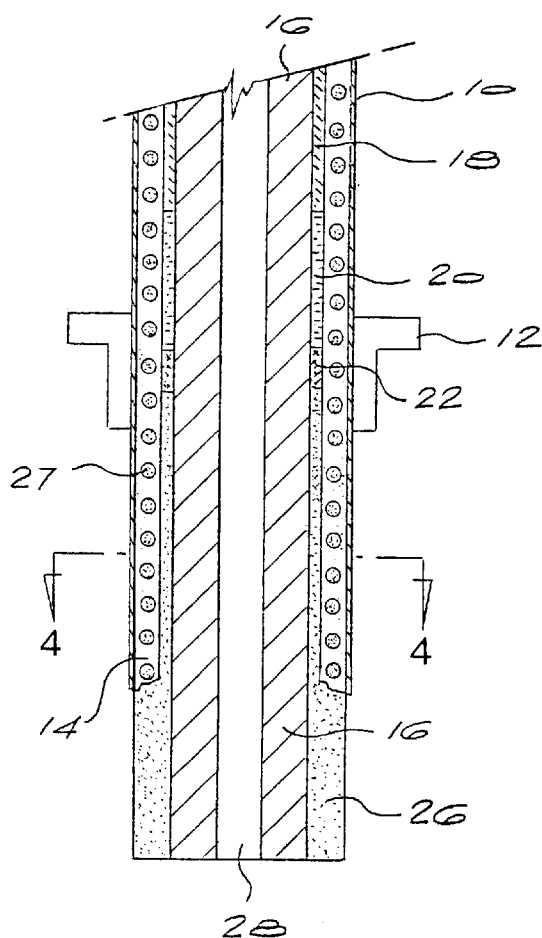
FIG. 3 is a schematic sectional side view of a second embodiment of the invention.
Figure 2:
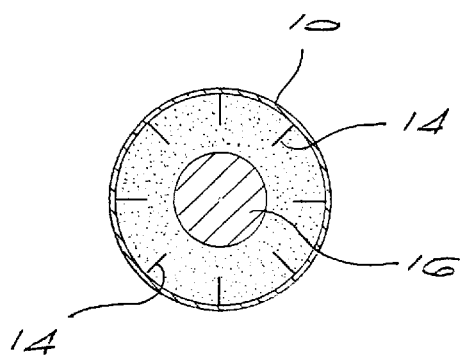
FIG. 2 is a section along the line 2—2 of FIG. 1.
Figure 4:
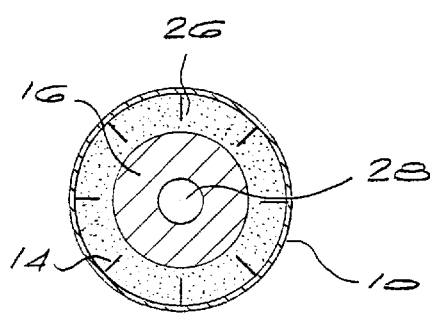
FIG. 4 is a section along the line 4—4 of FIG. 3.

The embodiment of FIGS. 3 and 4 is similar to that of the embodiment of FIGS. 1 and 2 and like parts carry like numerals. The electrode of this embodiment differs from that of the first embodiment in that a hole or feed passage 28 is axially formed through the core 16. Feed material for the furnace can be delivered through the feed passage 28. The provision of holes or apertures 27 in the ribs 14, as described above, allows for the use of relatively thin walled pre-baked electrodes with larger diameter feed passages without increasing the risk of joint fracture.

The electrodes described above have particular application in AC or DC arc plasma furnaces where traditionally pre-baked graphite electrodes have been used. The consumption of the expensive pre-baked graphite electrodes is reduced and, as a result, downtime is reduced. Further, larger diameter electrodes are possible enabling the use of higher electrode currents and increased operating capacity. In addition, the pre-baked graphite electrodes require less machining than conventional electrodes, if at all. Further, there is believed to be less oxidation of the pre-baked graphite electrodes due to the surrounding paste 18. The calcined hard paste 26 also assists supporting and strengthening the joints or nipples between joined electrodes. Due to the reduced graphite consumption, if desirable, lower current densities and less expensive quality graphite may be used. Alternatively, a thinner pre-baked electrode core may be used. In the case of the hollow core pre-baked electrode, the diameter of the hollow core may be increased to provide faster feeding of the feed material and, it is believed, better distribution thereof.

It is also envisaged that a conventional Söderberg electrode may be converted to a compound electrode as described previously by including a central core of a solid or hollow pre-baked graphite electrode or the like therein. It is believed that this will lead to an increase in the rate of baking of the paste and higher current densities resulting in increased productivity.

As a result of the form of the combined electrode, it is envisaged that a working platform may be formed around the electrode. This allows for the repairing of the electrode and other tasks such as welding, for example, to be effected.

The electrodes are particularly useful in the smelting of ferrochromium and in the reduction of ores such as ilmenite. They also have application in the smelting of scrap metal in steel furnaces.

What is claimed is:

1. A combination pre-baked and self-baking electrode for a smelting furnace comprising:

an elongate casing including a plurality of spaced, inwardly projecting ribs extending radially from an inner surface of the casing towards the centre of the casing;

a central core of a pre-baked electrode disposed within the casing free of the projecting ribs and defining a space between the core and the inner surface of the casing;

a heating zone located intermediate the ends of the casing; and a carbonaceous electrode paste received or receivable within the space between the core and the inner surface of the casing, the paste being arranged to be calcined into a baked, hard form upon entering the heating zone and to combine with the pre-baked electrode core.

2. An electrode according to claim 1, wherein the central core is a solid pre-baked graphite electrode.

3. An electrode according to claim 1, wherein the central core is a hollow pre-baked graphite electrode defining a feed passage between open ends thereof for feeding charge material into the furnace.

4. An electrode according to claim 1, wherein the inwardly projecting ribs are in the form of planar fins formed from an electrically conductive material.

5. An electrode according to claim 4, wherein the fins include a plurality of transversely formed apertures or holes for allowing electrode paste to pass through them so as to anchor or support the electrode upon baking.

6. An electrode according to claim 4 or claim 5, wherein the fins are formed of mild steel or stainless steel.

7. An electrode according to claim 1, wherein the combined electrode is cylindrical in shape and larger in diameter than a conventional pre-baked graphite electrode.

8. An electrode according to claim 1, wherein the smelting furnace is a DC arc plasma furnace.

* * * * *